US009449110B2

(12) United States Patent
Singh et al.

(10) Patent No.: US 9,449,110 B2
(45) Date of Patent: Sep. 20, 2016

(54) GEOTILES FOR FINDING RELEVANT RESULTS FROM A GEOGRAPHICALLY DISTRIBUTED SET

(71) Applicant: Microsoft Technology Licensing, LLC, Redmond, WA (US)

(72) Inventors: Tejeshwar Singh, Sammamish, WA (US); Hiren Shah, Redmond, WA (US); Haibo Lu, Redmond, WA (US); Gilbert Wong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 494 days.

(21) Appl. No.: 13/756,506

(22) Filed: Jan. 31, 2013

(65) Prior Publication Data

US 2014/0214791 A1 Jul. 31, 2014

(51) Int. Cl.
*G06F 17/30* (2006.01)
*G06Q 30/02* (2012.01)

(52) U.S. Cl.
CPC ....... *G06F 17/3087* (2013.01); *G06Q 30/0261* (2013.01)

(58) Field of Classification Search
CPC ................ G06F 17/30864; G06F 17/3087; G06Q 30/02; G06Q 30/0261
See application file for complete search history.

(56) References Cited

U.S. PATENT DOCUMENTS

| 2002/0156686 | A1* | 10/2002 | Kraft et al. ................ 705/26 |
| 2003/0061211 | A1* | 3/2003 | Shultz et al. ................ 707/3 |
| 2005/0091118 | A1 | 4/2005 | Fano |
| 2005/0107993 | A1* | 5/2005 | Cuthbert et al. ................ 703/2 |
| 2005/0262062 | A1* | 11/2005 | Xia ................ 707/3 |
| 2005/0270299 | A1 | 12/2005 | Rasmussen et al. |
| 2006/0101005 | A1* | 5/2006 | Yang et al. ................ 707/3 |
| 2007/0061245 | A1* | 3/2007 | Ramer et al. ................ 705/37 |
| 2007/0174116 | A1* | 7/2007 | Keith et al. ................ 705/14 |
| 2008/0051994 | A1* | 2/2008 | Fisher et al. ................ 701/210 |
| 2008/0126476 | A1* | 5/2008 | Nicholas et al. ............ 709/203 |
| 2008/0176583 | A1* | 7/2008 | Brachet et al. ............ 455/456.3 |
| 2008/0243783 | A1* | 10/2008 | Santi et al. ................ 707/3 |
| 2009/0106681 | A1* | 4/2009 | Gupta et al. ................ 715/771 |
| 2010/0057586 | A1* | 3/2010 | Chow ................ 705/26 |

(Continued)

OTHER PUBLICATIONS

Ma et al., Programming Keynotes on J2ME-based Mobile Map Services, 2008, IEEE, pp. 1-4.*

(Continued)

*Primary Examiner* — Leslie Wong
(74) *Attorney, Agent, or Firm* — Steven Spellman; Tom Wong; Micky Minhas

(57) ABSTRACT

Architecture that utilizes geotiles to return locally relevant results across a geographically distributed set of locations. As applied to retail operations the business entity may have a retail presence in many different geographical areas (e.g., regions) of a country. Each retail presence is processed to obtain the associated geographical coordinates, which are the4n utilized to select one or more geotiles of a mapping system. The geotile(s) for those geographical coordinates are than identified and related to the location. The business entity may be associated with a deal (offer) that is queried using a search engine. The relationships of the deal, retail stores, geographical coordinates of the retail stores, and related geotiles are memorialized in a feed document. Thus, when a query is made for the deal, the search engine accesses the feed document and returns the geotiles for visual presentation of the associated retailer as part of the search result.

21 Claims, 7 Drawing Sheets

(56) References Cited

U.S. PATENT DOCUMENTS

| | | |
|---|---|---|
| 2010/0235381 A1 | 9/2010 | Sukanen et al. |
| 2010/0241507 A1* | 9/2010 | Quinn et al. ............... 705/14.42 |
| 2010/0325127 A1 | 12/2010 | Chaudhuri et al. |
| 2011/0055290 A1* | 3/2011 | Li et al. ........................ 707/807 |
| 2011/0218985 A1* | 9/2011 | Camper ........................ 707/707 |
| 2012/0054001 A1* | 3/2012 | Zivkovic et al. ............. 705/14.1 |
| 2012/0215614 A1 | 8/2012 | Hochstatter et al. |
| 2012/0254186 A1* | 10/2012 | Winner et al. ................ 707/740 |
| 2012/0278171 A1* | 11/2012 | Tang et al. ................. 705/14.57 |
| 2013/0191223 A1* | 7/2013 | Harris et al. ............... 705/14.66 |
| 2013/0332274 A1* | 12/2013 | Faith et al. ................. 705/14.53 |
| 2014/0039911 A1* | 2/2014 | Iyer ................................... 705/2 |
| 2014/0129566 A1* | 5/2014 | Chang et al. ................. 707/742 |
| 2014/0327547 A1* | 11/2014 | Johnson et al. ............. 340/601 |
| 2014/0365304 A1* | 12/2014 | Showers et al. ........... 705/14.55 |

OTHER PUBLICATIONS

Reddy et al., TerraVision II: Visualizing Massive Terrain Databases in VRML, Mar./Apr. 1999, IEEE, pp. 1-9.*

Reddy et al., Modeling the Digital Earth in VRML, 1999, pp. 1-10.*

Hershey et al., Automating the Generation of Large Scale Environments, Jun. 2011, pp. 1-9.*

Cong et al., "Efficient Retrieval of the Top-k Most Relevant Spatial Web Objects", Proceedings of the VLDB Endowment, Aug. 2009, 12 pages, vol. 2, Issue 1.

Zhou et al., "Hybrid Index Structures for Location-based Web Search", Proceedings of the 14th ACM International Conference on Information and Knowledge Management, Oct. 31, 2005, pp. 155-162.

* cited by examiner

US 9,449,110 B2

GEOTILES FOR FINDING RELEVANT RESULTS FROM A GEOGRAPHICALLY DISTRIBUTED SET

BACKGROUND

Searching for offers from national (and other multi-outlet) retailers typically includes arbitrary pre-specified query criteria (e.g., brand, price range, reviews, etc.). However, in order to provide an appealing user experience, the challenge is to only return those retailers that are within a specified distance of a given geographical area. This needs to be accomplished in a web/document index context where performing online joins across multiple queries is currently not performant or feasible.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture utilizes geotile information to return locally relevant search results across a geographically distributed set of locations that may be queried. All related points of interest (POIs) (e.g., retailer, business entity, parks, etc.) are identified geographically and then geographical coordinates are computed. The POI may be associated with a piece of information (e.g., a notice, offer, event, deal, etc.) that is queried using a search engine. The geographical location of the user making the query is determined. The geotile(s) for those geographical coordinates of the related POIs are than identified and related to the location. The relationships of the piece of information, POI, geographical coordinates of the POI, and related geotiles are memorialized in a feed document. Thus, when a query is made by the user for the piece of information, the search engine accesses the feed document, compares the user geographic coordinates with the geotiles of the POIs, and returns only this POIs that have the queried information. Additionally, the geotiles for those relevant results can be returned for visual presentation of the associated POI as part of the search result.

Where the architecture is applied to retail operations, for example, a business entity (also referred to as a retailer) may have a retail presence (e.g., brick-and-mortar structures such as stores) in many different geographical areas (e.g., regions) of a country. Each retail presence is typically identified as a store (e.g., the Retailer store in CityA, a street address, mall, etc.), but in addition, each retail presence is processed (geocoded) to obtain the associated geographical coordinates (e.g., latitude/longitude). The geographical coordinates of each store can then be utilized to find an associated base geotile using a mapping system. The base geotile and encompassing geotiles for those geographical coordinates are than identified and related to the location.

The business entity may be associated with a deal (offer) that is queried by a user using a search engine. The current geographic location of the user can be determined. There may be multiple retail stores where the deal is offered such as all stores in the Northeastern part of the country and Southwestern part of the country. The relationships of the deal, retail stores, geographical coordinates of the retail stores, and related geotiles are memorialized in a feed document. Each deal has a single deal (feed) document. Thus, when a query is made for the deal (e.g., associated article of commerce, item of information, etc.), the current location of the user can be used to match one or more geotiles in the feed document and return the locations, and hence, the associate retail stores to the user for where the deal can be obtained. Additionally, the encompassing geotiles of a given store can be presented as part of the search result.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
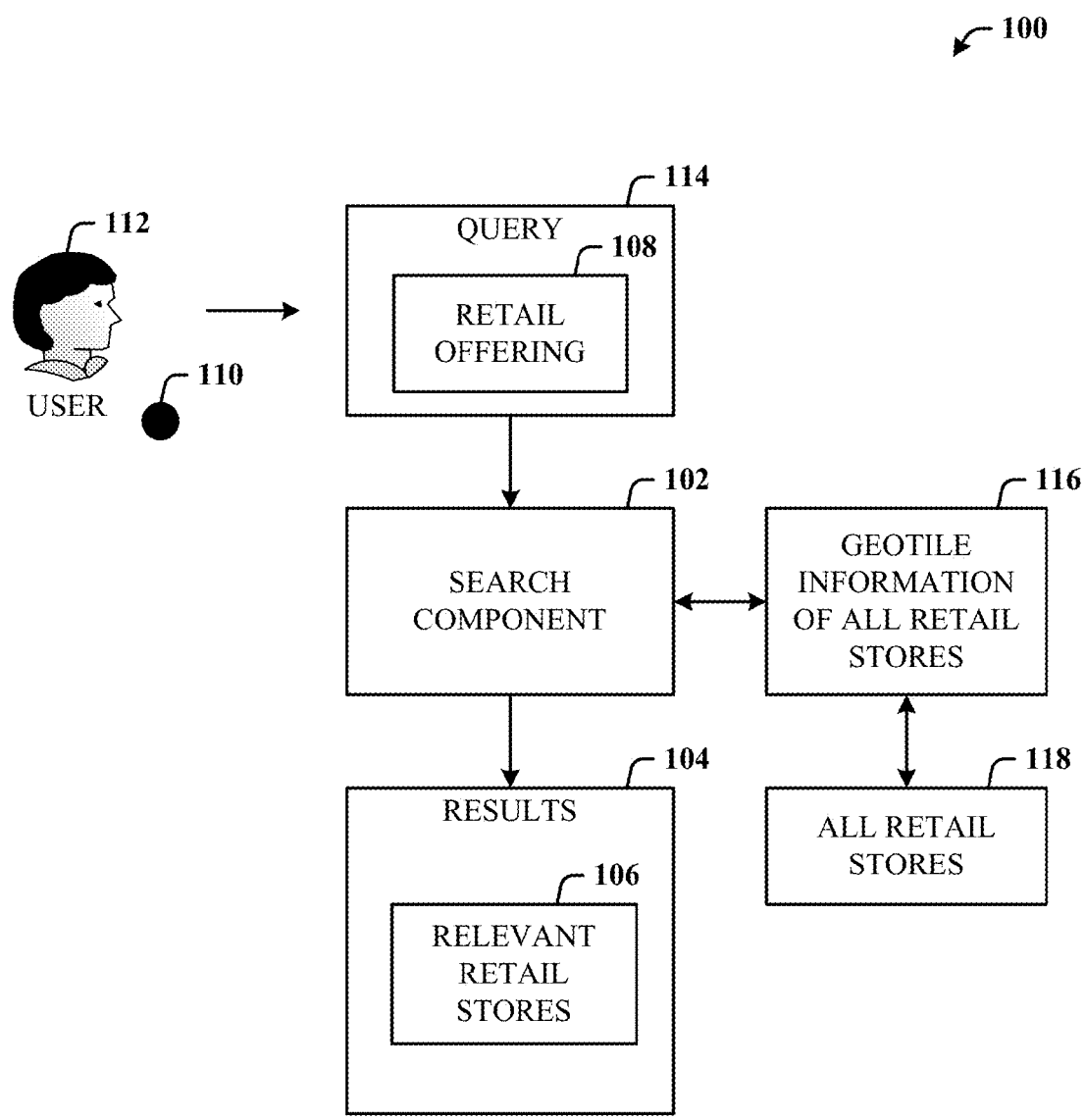
FIG. 1 illustrates a system in accordance with the disclosed architecture.

The disclosed architecture utilizes geotiles to return locally relevant results across a geographically distributed set. In other words, a point of interest (POI) is converted into a string of geographical coordinates that are then mapped to an identifier of a given geotile. Each geotile may have a single POI or multiple POIs. In a retail application, the user query can be to "find the deals for a given item" while the user is in a specific geographical area. The geographic location of the user can be ascertained using many different existing techniques, such as global positioning system (GPS), cellular tower activity, IP detection, purchase tracking, and so on.

As a general description, a POI (e.g., retailer, business entity, national park, etc.) is identified geographically and then geographical coordinates for the POI are computed. The POI (e.g., a national park) may be associated with a piece of information (e.g., opening day, an event, a notice, offer, deal, etc.) that is queried using a search engine. The geotile(s) for those geographical coordinates are than identified, obtained, and related to the geographical coordinates of the POI location. The relationships of the piece of information, POI, geographical coordinates of the POI, and related geotiles are memorialized in a feed document. Thus, when a query is made for the piece of information, for example, the search engine accesses the feed document associated with that specific piece of information, uses the geographic location of the user to match a geotile of the potentially many geotiles in the document index, and returns as results only the geographic locations within a predetermined proximity of the user that are currently providing the piece of information. The geotiles for the selected locations can then be returned for visual presentation of the associated POI as part of the search result.

In a more specific implementation of the disclosed architecture to a retailer having geographically distributed sites (store locations) and offers (e.g., sales) being made via one or more of the store locations, the architecture generates feed documents which represent a deal and comprises a list (index) of location geotiles. Accordingly, this enables the representation of all national deals in combination with geographical location information, rather than creating an inordinate amount of information for of stores, locations, and deals.

The architecture is facilitated using offline and online processes. Offline feed document index generation steps include the following. For each business entity (also referred to as a retailer, or more generally as a point of interest), all retail locations of the business entity are identified. This can either be provided as part of an offer data source from the retailer or extracted by logically joining retailer information against locally available data (e.g., a telephone book type data source). The entire list of these location addresses is then geocoded (converted to geographical coordinates) to obtain the latitude and longitude information for a given retailer location. From the geographical coordinates the base geotile that this retail location (or outlet) is geographically located can be computed. Note that to accurately support multiple query radii, multiple geotiles can be utilized. For instance, the query may specify 0.2 mile or 40 miles (e.g., within the allowed range of the query interface). Arbitrarily chosen can include discrete radii such as 1, 5, 20, and 100 miles. For each retailer location coordinates and radius, it may be insufficient to use only one geotile. Accordingly, the eight encompassing geotiles may also be identified and utilized for presentation. This capability accurately supports a radius search.

One feed document is created per deal (or offer). The feed document enumerates all geotiles for all known retailer locations for the given deal. The list of geotiles by retail location is added as document index tags to the offer document.

With respect to online querying, the online querying system can now generate a geotile using the query location centroid (the two-dimensional center of an area) and radius. The geotile can then be used to query the document index and be assured of only querying over offers that are locally relevant. As a final step, the online query system can calculate the exact distance between the query centroid and the returned list of retailer outlets, and drop any of the retail outlets that are located outside the query radius. The location search is based on predefined geotiles.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 comprises a search component 102 that returns results 104 of relevant retail stores 106 of a business entity for a retail offering 108. The retail stores 106 are relevant to a geographical location 110 of a user 112 making a query 114 for the retail offering 108. The relevant retail stores 106 are obtained (computed) based on comparison of the geographical location 110 of the user 112 to geotile information 116 of all the retail stores 118 of the business entity.

The results 104 include the relevant stores 106 within multiple different radii from the geographic location 110 of the user 112. The search component 102 computes a distance between a centroid of a geotile associated with the query 114 and returns a list of retail stores that match the query 114, using a query radius, and filters out retail stores outside the query radius.

Figure 2:
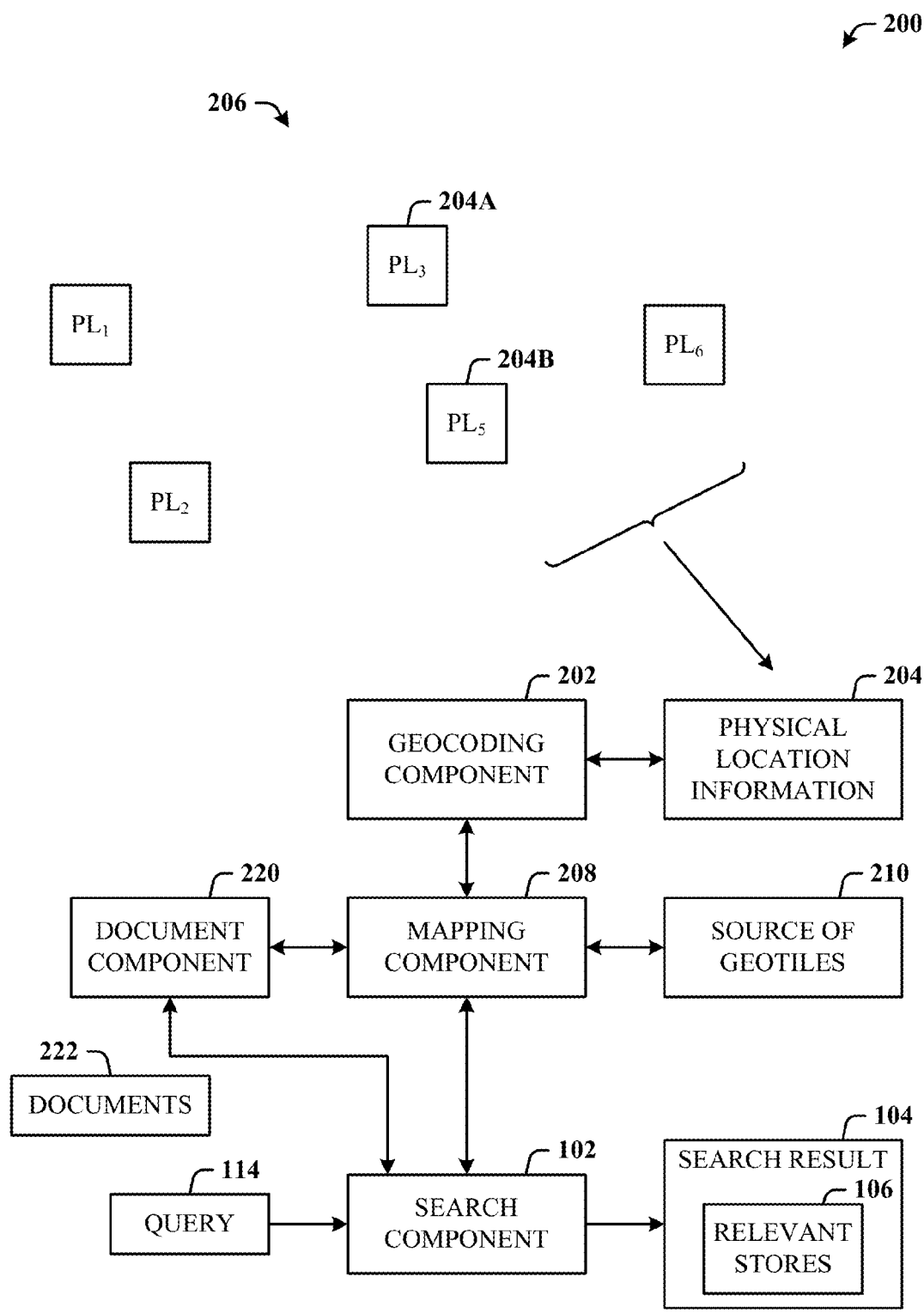
FIG. 2 illustrates a more detailed system in accordance with the disclosed architecture.

FIG. 2 illustrates a more detailed system 200 in accordance with the disclosed architecture. The system 200 can include a geocoding component 202 that geocodes physical locations (PLs) 204 (e.g., physical locations 204A and 204B) of a geographically distributed set 206 related to a given business entity to define the physical locations 204 as geographical coordinates. (Geocoding converts physical location information (e.g., address) of a physical location (PL) into geographic coordinates (e.g., latitude/longitude).)

More generally, each business entity (e.g., a retailer) and its associated business outlets (also referred to as retail stores) can be distributed throughout a geographical area (e.g., city, county, state, regionally by states, nationwide, internationally, etc.). The physical location information of each of the physical locations 204 can be obtained as part of an offer (deal) data source or extracted by comparing provided business entity information against local business indexes (e.g., telephone books, online information websites, etc.) to obtain the physical information in the desired format and for a given geographical area. For example, one or more of a street address, city name, and postal code (e.g., zip code) can be obtained locally to definitively identify and geocode the retail locations for regions of the overall geographical area.

It is to be understood that geocoding can be performed for all the retail stores of the many different physical locations of the geographically distributed set. The same deal can be offered at different locations nationwide, for example, but only those physical locations of a local area in which the user is located will be returned to the user.

A mapping component 208 identifies a geotile (from a source of geotiles 210) associated with each of the geocoded physical locations. That is, once the geographical coordinates of a given physical location are determined, those coordinates can be employed to obtain (relate to) the geotile in which those coordinates are found. Each geotile is identifiable by a string, and if the geographical coordinates of a retail store reside within (or match favorably to) the string, that geotile is mapped (related) to those geographical coordinates (and hence, the associated retail store).

The search component 102 (e.g., a search engine) processes the query 114 for a deal (or generally, for all deals (retail offerings)) of the business entity and returns only locally relevant store or stores in the area in which the user currently resides or within a radius thereof.

The system 200 can further comprise a document component 220 that generates documents 222 which represent the deal and a document index of physical location geotiles for a given locale. The document component 220 creates one document per deal. The document index of physical location geotiles enumerates all relevant physical locations (or retail stores) of the deal. The search component 102 (which interfaces to the document component 220) can include a search engine that queries the document index to find only locally relevant physical locations of the deal. The result 104 includes physical locations (or retail stores) within multiple different radii from a given physical location related to the query (and the user). The mapping component 208 identifies a set of geotiles for each physical location of the business entity. The search component 102 computes a query distance between a physical location centroid associated with the query and a returned list of retail store physical locations that match the query, using a query radius, and filters out physical locations outside (unwanted) the query radius.

Put another way, the system further comprises the document component that generates a document that represents the retail offering and a document index of physical location geotiles of the retail stores providing the retail offering. The document index of physical location geotiles enumerates all relevant physical locations of the retail stores providing the retail offering deal. The search component includes a search engine that queries the geotile information of the document index to find only locally relevant retail stores for the retail offering. The document component creates one document per the retail offering.

Figure 3:
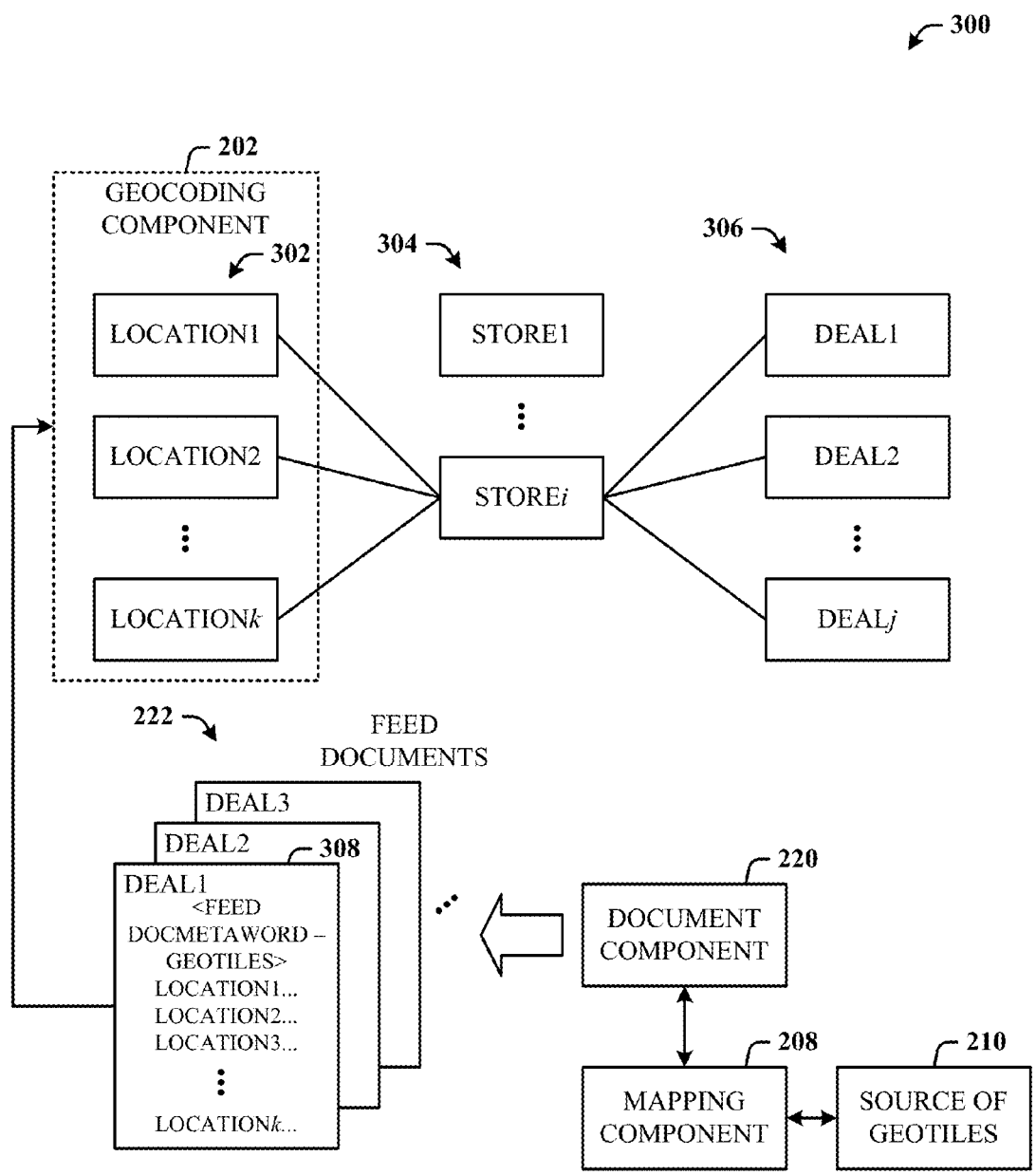
FIG. 3 illustrates a relational diagram between locations, stores, and deals, as defined in feed documents, in accordance with the disclosed architecture.

FIG. 3 illustrates a relational diagram 300 between locations 302 (also PLs of FIG. 2), stores 304, and deals 306, as defined in feed documents 222, in accordance with the disclosed architecture. The business entity (e.g., retailer) can comprise business presences (retail stores) at numerous physical geographical locations over a geographical area (e.g., nationwide). Each feed document (e.g., a feed document 308) represents a deal (offer) and comprises a list (index) of locations (geocoded location information, or actual retail store names) and associated geotiles for the locations that offer that deal. This technique enables the representation of all deals (e.g., nationally) using location information, rather than creating an inordinate number documents ($i \times j \times k$).

The geocoding component 202 converts the address information of the retail stores, for example, into geographical coordinates, depicted as Location1, Location2, . . . ,Locationk. Thus, there is a well-defined relationship between an actual store (e.g., the Retailer Store in Fairlawn, Ohio) and its geographical coordinates (e.g., the latitude/longitude coordinates for the Fairlawn Store). Additionally, one or more of the stores 304 (Store1, . . . ,Storei) run advertisements for deals 306 (Deal1, . . . ,Dealn. For example, Store1 in Ohio may offer deals Deal1 and Deal2, while Store2 in Idaho may offer Deal2.

The document component 220 obtains the identifying geotile information (of a base geotile) for a given location (e.g., Location1) from the mapping component 208 (as obtained from the source of geotiles 210) and provides the geotile information for insertion into a deal document 308 in association with the proper location (location coordinate information). Although this can be for a single geotile, in another implementation, multiple geotiles (e.g., eight additional) are obtained about the given location (or base geotile). Thus, a location will be presented in the base geotile in which it is geographically located, plus eight additional contacting (encompassing) geotiles (immediate above, immediate below, immediate left, immediate right, immediate upper left, immediate upper right, immediate lower left, and immediate lower right).

Thus, by knowing the geographic location of the user making the query, the documents 222 can be searched for the deal document 308 based on the query identifying the specific deal. Additionally, using the user's geographic information, the corresponding geotile can be found and related to the only locations (and hence, retail stores) within a certain distance from the user that are making the retail offering.

Figure 4:
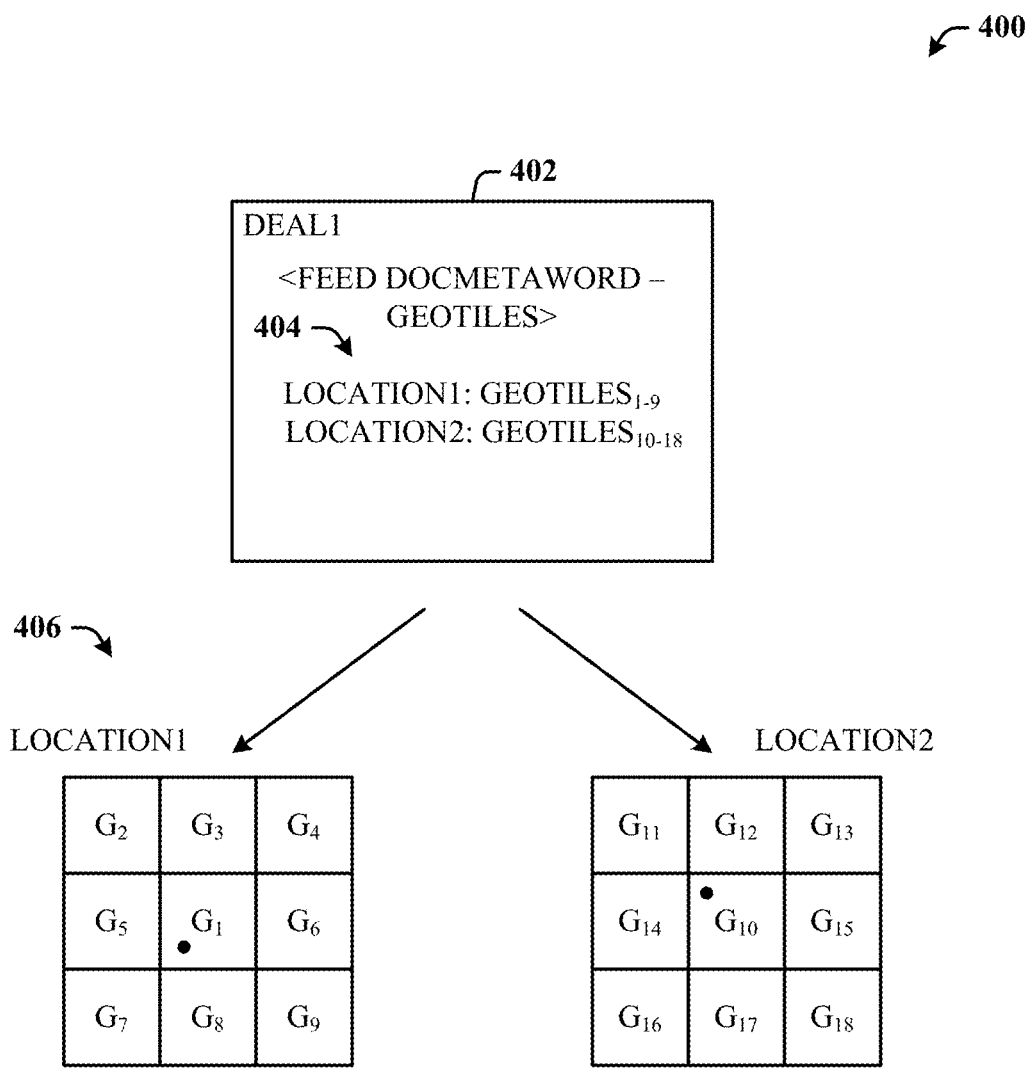
FIG. 4 illustrates a diagram of a feed document and associated indexed locations as visually represented using geotiles.

FIG. 4 illustrates a diagram 400 of a feed document 402 and associated indexed locations 404 as visually represented using geotiles 406. The feed document 402 is associated with a deal (Deal1), and lists all retailer locations (Location1 and Location2) currently offering the deal.

Here, two locations 404 are indexed with the associated geotiles (via geotile information). The first location (Location1, denoted as the black dot in geotile $G_1$) relates to nine geotiles, a base geotile $G_1$, and eight encompassing geotiles $G_2$-$G_9$, and second location (Location2, denoted as the black dot in geotile $G_{10}$) relates to nine geotiles, a base geotile $G_{10}$, and eight encompassing geotiles $G_{11}$-$G_{18}$. If the user location matches the base geotile information of base geotile, $G_1$, then it is known that the first location is the closest retail store offering the deal. However, if the user location matches the base geotile information of base geotile, $G_{10}$, then it is known that the second location is the closest retail store to the user offering the deal.

The multiple encompassing geotiles are employed when providing the capability to process multiple different radii in the query interface. While the base geotile may be sufficient for smaller radii such as one mile, five miles, etc., the additional encompassing geotiles (and e.g., even the next outer ring of sixteen) may be useful for the larger radii, for example, twenty miles, forty miles, one hundred miles, etc.

This means that if the user location matches any of the eight encompassing geotiles of the first location, then the first location is returned in the results to indicate that Location1 (in geotile $G_1$) is within the specified radius and offers the deal. Similarly, if the user location matches favorably to geotile $G_{18}$, then Location2 (in geotile $G_{10}$) is returned in the results as offering the deal. In any case, the geotile(s) can then be presented for visual perception by the user of the location(s).

It may be the case that the locations 404 in the document 402 are not geographically close to the location of the user making the query. Thus, no results will be returned. In such a scenario, the architecture can be automatically configured to show the nearest retail store, even if outside the search radius selected by the user. Alternatively, if the nearest retail store offering the deal is within a certain distance (e.g., two miles) outside the radius selected by the user, the architecture can make this known to the user. In other words, the time to travel twenty-two miles versus a selected radius of twenty miles may be so small that the user would find it useful to know that the store is only an additional two miles, rather than not knowing this at all.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
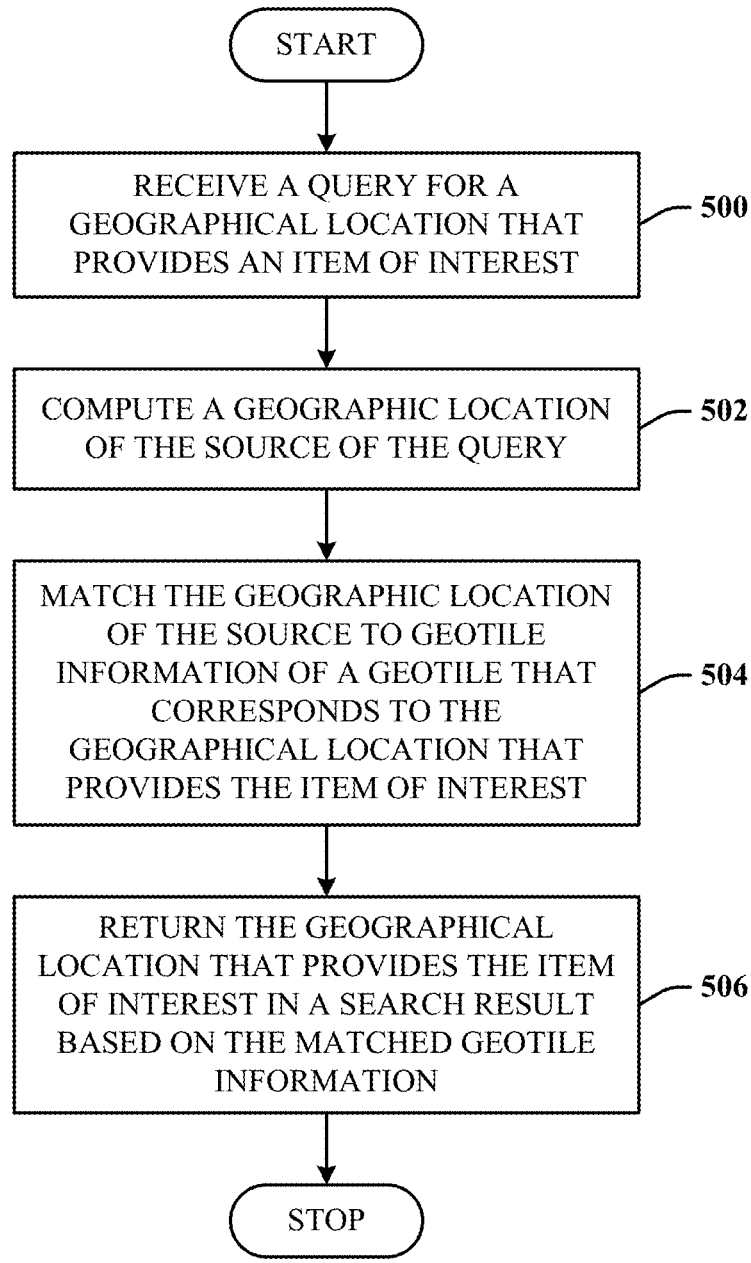
FIG. 5 illustrates a method in accordance with the disclosed architecture.

FIG. 5 illustrates a method in accordance with the disclosed architecture. At 500, a query is received for a geographical location that provides an item of interest. At 502, a geographic location of the source of the query is computed. At 504, the geographic location of the source is matched to geotile information of a geotile that corresponds to the geographical location that provides the item of interest. At 506, the geographical location that provides the item of interest is returned in a search result based on the matched geotile information. A microprocessor can be configured to execute instructions associated with at least one of the acts of receiving, computing, matching, or returning.

The method can further comprise generating a feed document that represents the item of interest and a list of corresponding geotile information of all geographic locations that can provide the item of interest. The method can further comprise geocoding geographic information of the geographic location that provides the item of interest and obtaining the geotile information of the geotile that corresponds to geocoded geographic information.

The method can further comprise enabling a radius search as part of the query to return all geographical locations that provide the item of interest based on associated geotile information of a feed document. The method can further comprise identifying a base geotile and encompassing geotiles of the geographic location that provides the item of interest. The method can further comprise creating a single feed document for a single item of interest and indexing all geographic locations and associated geotile information of the geographic locations that can provide the item of interest.

The method can further comprise processing a centroid related to the geographic location of the source of the query and processing a radius associated with the centroid to identify a geotile associated with a geographical location that provides the item of interest. The method can further comprise computing a distance between the centroid and returned list of geographical location that can provide the item of interest, and removing from the list geographical locations that exceed the radius.

Figure 6:
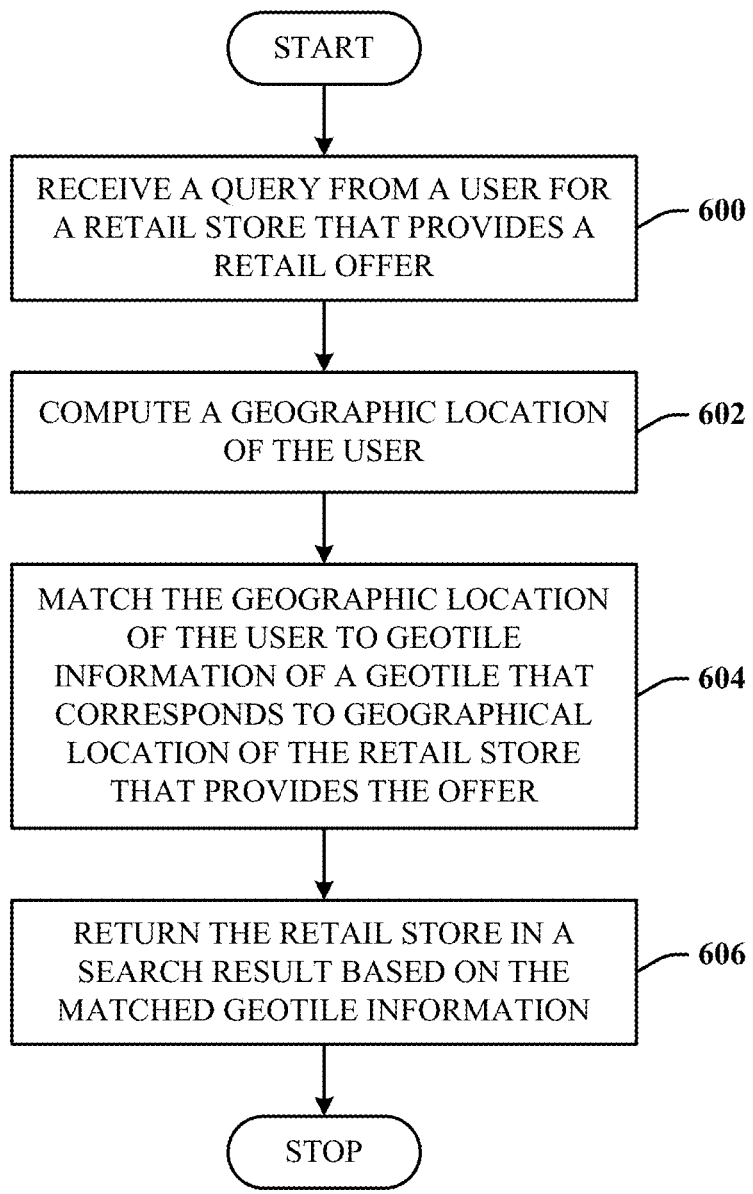
FIG. 6 illustrates an alternative method in accordance with the disclosed architecture.

FIG. 6 illustrates an alternative method in accordance with the disclosed architecture. At 600, a query is received from a user for a retail store that provides a retail offer. At 602, a geographic location of the user is computed. At 604, the geographic location of the user is matched to geotile information of a geotile that corresponds to geographical location of the retail store that provides the offer. At 606, the retail store is returned in a search result based on the matched geotile information.

The method can further comprise creating a single feed document for the retail offer and indexing all retail stores and associated geotile information. The method can further comprise processing a centroid related to the geographic location of the user and processing a radius associated with the centroid to identify a geotile associated with the retail store. The method can further comprise computing the geotile as a base geotile and finding encompassing geotiles of the base geotile for indexing in a feed document.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
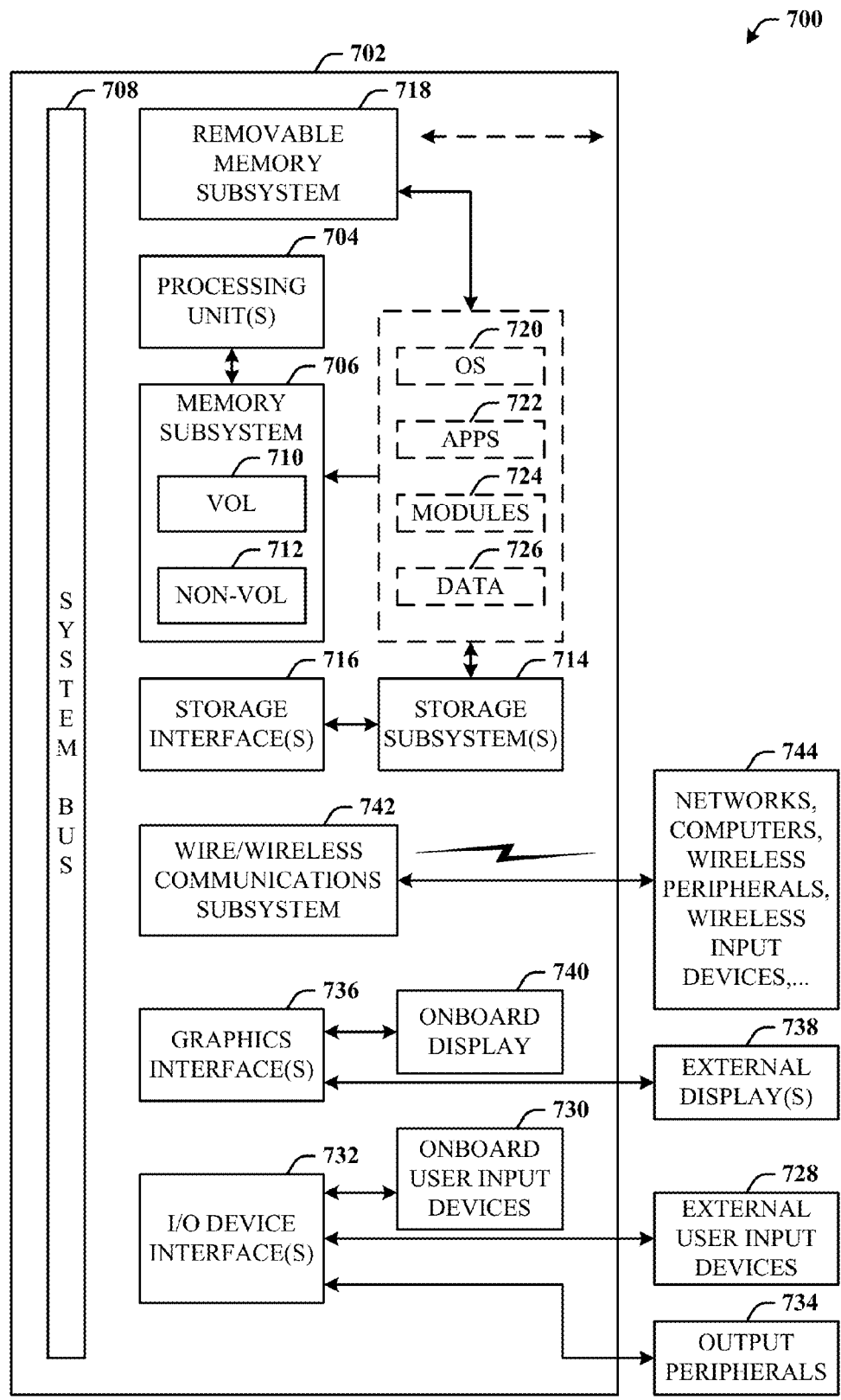
FIG. 7 illustrates a block diagram of a computing system that uses geotile to find locally relevant results of geographic locations from a distributed set of such locations in accordance with the disclosed architecture.

Referring now to FIG. 7, there is illustrated a block diagram of a computing system 700 that uses geotile to find locally relevant results of geographic locations from a distributed set of such locations in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704 (also referred to as microprocessor(s) and processor(s)), a computer-readable storage medium such as a system memory 706 (computer readable storage medium/media also include magnetic disks, optical disks, solid state drives, external memory systems, and flash memory drives), and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL)

memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components of the system 200 of FIG. 2, entities and components of the relational diagram 300 of FIG. 3, entities and components of the diagram 400 of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) can be any available media (medium) that do (does) not employ propagated signals, can be accessed by the computer 702, and includes volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example.

These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method for returning a locally relevant search result across a geographically distributed set of locations for a business entity, the method comprising acts of:
    mapping a geotile to each location within the geographically distributed set of locations based on physical location information;
    creating a feed document that represents an item of interest for the business entity, wherein the feed document comprises a list of the geographically distributed set of locations for the business entity and the geotile mapped to each location in the geographically distributed set of locations;
    receiving a query for the item of interest;
    computing a geographic location of a source of the query;
    searching the feed document to identify a relevant geotile that corresponds to the geographic location of the source of the query; and
    returning a locally relevant search result that comprises a relevant location that provides the item of interest, wherein the relevant location is mapped to the relevant geotile.

2. The method of claim 1, wherein mapping a geotile to each location within the geographically distributed set of locations further comprises:
    geocoding the physical location information of each location and identifying the geotile that corresponds to the geocoded information.

3. The method of claim 1, wherein mapping a geotile to each location within the geographically distributed set of locations further comprises:
    mapping a base geotile and one or more encompassing geotiles to each location within the geographically distributed set of locations based on the physical location information.

4. The method of claim 1, further comprising processing a centroid related to the geographic location of the source of the query and processing a radius associated with the centroid to identify a relevant geotile associated with a geographical location that provides the item of interest.

5. The method of claim 4, further comprising:
    identifying a plurality of relevant locations that are mapped to the relevant geotile;
    computing a distance between the centroid and each of the plurality of relevant locations that can provide the item of interest; and
    removing from the locally relevant search result the relevant locations that exceed the radius.

6. The method of claim 1, wherein the relevant location comprises a plurality of locations that map to the relevant geotile.

7. The method of claim 1, wherein the relevant geotile comprises a plurality of relevant geotiles that corresponds to the geographic location of the source of the query.

8. The method of claim 7, wherein the relevant location comprises a plurality of locations that map to each of plurality of relevant geotiles.

9. A method performed by a computer system executing machine readable instructions, the method comprising acts of:
    identifying all retails stores for a business, wherein each of the retail stores has physical location information;
    mapping a geotile to each of the retail stores of the business based on the physical location information;
    creating a single feed document for a retail offer from the business, wherein the feed document comprises a list of all of the retail stores and the geotile mapped to each of the retail stores;
    receiving a query from a user for the retail offer;
    computing a geographic location of the user;
    matching the geographic location of the user to a relevant geotile from the feed document; and
    returning a search result in response to the search query, wherein the search result is limited to a relevant retail store that is mapped to the relevant geotile.

10. The method of claim 9, further comprising processing a centroid related to the geographic location of the user and processing a radius associated with the centroid to match the geographic location of the user to the relevant geotile.

11. The method of claim 9, further comprising computing the geotile mapped to each of the retail stores as a base geotile and finding encompassing geotiles of the base geotile.

12. The method of claim 9, further comprising mapping a plurality of geotiles to at least one of the retail stores of the business based on the physical location information.

13. A system comprising:
    a processor; and
    memory communicatively coupled to the processor, the memory storing computer-readable instructions that when executed by the processor cause the system to:
        identify all points of interest for a business entity, wherein each of the points of interest has physical location information;

map a geotile to each of the points of interest based on the physical location information;

create a single feed document representing an offer from the business entity, wherein the feed document comprises a list of all of the points of interest for the business entity and the geotile that is mapped to each of the points of interest;

receive a search query for the offer of the business entity, wherein the search query is associated with a location;

identify a relevant geotile from the feed document based on the location associated with the search query; and identify a relevant point of interest that is mapped to the relevant geotile;

return a search result in response to the search query, wherein the search result is limited to the relevant point of interest.

14. The system of claim 13, wherein the relevant point of interest comprises a plurality of points of interest that map to the relevant geotile.

15. The system of claim 13, further comprising computer-readable instructions that when executed by the processor cause the system to:

identify a plurality of relevant geotiles that correspond to the location associated with the query.

16. The system of claim 15, further comprising computer-readable instructions that when executed by the processor cause the system to:

identify a plurality of relevant points of interest that map to each of the plurality of relevant geotiles that correspond to the location associated with the query; and return the search result that includes the plurality of relevant points of interest that map to each of the plurality of relevant geotiles.

17. The system of claim 15, wherein the plurality of relevant geotiles comprises a base geotile and one or more encompassing geotiles.

18. The system of claim 15, further comprising computer-readable instructions that when executed by the processor cause the system to:

process a centroid related to the location associated with the search query; and process a radius associated with the centroid to identify the plurality of relevant geotiles from the feed document that correspond to the location associated with the query.

19. The system of claim 18, further comprising computer-readable instructions that when executed by the processor cause the system to:

identify a plurality of relevant points of interest that map to each of the plurality of relevant geotiles that correspond to the location associated with the query;

compute a distance between the centroid and each of the plurality of relevant points of interest; and remove from the search result any of the relevant points of interest that exceed the radius.

20. The system of claim 13, wherein the feed document further comprises the physical location information for each of the points of interest.

21. The system of claim 13, further comprising computer-readable instructions that when executed by the processor cause the system to:

return the relevant geotile as part of the search result in response to the search query.

* * * * *